US009262132B1

(12) United States Patent
Lugton

(10) Patent No.: US 9,262,132 B1
(45) Date of Patent: Feb. 16, 2016

(54) INCREMENTAL LOCAL SOURCE CODE ANALYSIS

(71) Applicant: Semmle Limited, Oxford (GB)

(72) Inventor: John Alexander Lugton, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 14/684,646

(22) Filed: Apr. 13, 2015

(51) Int. Cl.
*G06F 9/44* (2006.01)

(52) U.S. Cl.
CPC ... *G06F 8/34* (2013.01); *G06F 8/36* (2013.01)

(58) Field of Classification Search
USPC .................. 717/124–129, 140–141, 105–115
IPC ................................ G06F 8/34,8/41, 8/42, 8/36
See application file for complete search history.

(56) References Cited

U.S. PATENT DOCUMENTS

| | | | | | |
|---|---|---|---|---|---|
| 5,325,533 | A | * | 6/1994 | McInerney | G06F 8/71 717/107 |
| 5,491,821 | A | * | 2/1996 | Kilis | G06F 8/48 717/110 |
| 5,956,479 | A | * | 9/1999 | McInerney et al. | 714/38.13 |
| 6,493,868 | B1 | * | 12/2002 | DaSilva | G06F 8/20 345/1.3 |
| 6,728,951 | B1 | * | 4/2004 | Gibson | G06F 8/71 717/111 |
| 6,971,091 | B1 | * | 11/2005 | Arnold et al. | 717/145 |
| 7,174,536 | B1 | * | 2/2007 | Kothari | G06F 11/3664 717/105 |
| 7,536,676 | B2 | * | 5/2009 | Baker | G06F 8/20 717/100 |
| 8,140,850 | B2 | * | 3/2012 | Horne et al. | 713/176 |
| 8,250,137 | B1 | * | 8/2012 | Nielsen | H04L 41/5058 709/203 |
| 8,464,214 | B2 | * | 6/2013 | Miloushev | G06F 8/24 717/105 |
| 8,504,994 | B2 | * | 8/2013 | Golender et al. | 717/128 |
| 8,595,703 | B2 | * | 11/2013 | van Gogh et al. | 717/126 |
| 8,665,658 | B2 | * | 3/2014 | Chen | G11C 7/227 365/189.14 |
| 8,959,496 | B2 | * | 2/2015 | Schulte et al. | 717/148 |
| 8,997,055 | B2 | * | 3/2015 | van Gogh | G06F 11/3604 714/38.1 |
| 8,997,067 | B2 | * | 3/2015 | Igelka | G06F 8/71 717/140 |

OTHER PUBLICATIONS

Arzt et al, "Using Targeted Symbolic Execution for Reducing False-Positives in Dataflow Analysis", ACM, pp. 1-6, 2015.*
Privat et al, "Link-Time Static Analysis for Efficient Separate Compilation of Object-Oriented Languages", ACM, pp. 20-27, 2005.*
Yardimci et al, "Mostly Static Program Partitioning of Binary Executables", ACM Transactions on Programming Languages and Systems, vol. 31, No. 5, Article 17, pp. 1-46, 2009.*
Assunção et al, "Extracting Variability-Safe Feature Models from Source Code Dependencies in System Variants", ACM, pp. 1303-1310, 2015.*
Arzt et al, "Reviser: Efficiently Updating IDE-/IFDS-Based Data-Flow Analyses in Response to Incremental Program Changes", ACM, pp. 288-298, 2014.*
Allowatt et al, "IDE Support for Test-driven Development and Automated Grading in Both Java and C++", ACM, pp. 100-104, 2005.*

* cited by examiner

*Primary Examiner* — Anil Khatri
(74) *Attorney, Agent, or Firm* — Fish & Richardson P.C.

(57) ABSTRACT

Methods, systems, and apparatus, including computer programs encoded on computer storage media, for displaying updated static analysis results within an integrated development environment (IDE) using incremental build information. One of the methods includes receiving, by a static analysis plug-in of an integrated development environment (IDE) application installed on a user device, incremental build information. A plurality of extraction commands are generated from the incremental build information, and source code is extracted from the one or more source code files according to the plurality of generated extraction commands. Updated static analysis results are generated and presented to a user within the IDE.

20 Claims, 3 Drawing Sheets

INCREMENTAL LOCAL SOURCE CODE ANALYSIS

BACKGROUND

This specification relates to static analysis of computer software source code.

Static analysis refers to techniques for analyzing computer software source code without executing the source code as a computer software program.

Static analysis can be performed on a code base, which may be referred to as a project. A project generally includes a collection of source code files organized in a particular way, e.g., arranged in a hierarchical directory structure, with each source code file in the project having a respective path.

Software developers can develop and maintain source code in a project using an integrated development environment (IDE). Example IDEs include Eclipse, available from the Eclipse Foundation, and NetBeans, available from Oracle Corporation. An IDE is an application, or a suite of applications, that facilitates developing source code on a single user device through a graphical user interface. An IDE usually has applications including a source code editor, a compiler, and a debugger. IDEs often also have a file browser as well as object and class browsers.

In this specification, for brevity, operations will sometimes be described as being performed by an IDE. To say that operations being are performed by an IDE means that one or more of the software applications of the IDE performs the operations. For example, to say that an IDE compiles source code files means that a compiler of the IDE compiles source code files.

IDEs can present, in a graphical user interface, information identifying compiler and linker errors and warnings. An IDE can also highlight the lines of source code that generate such errors and warnings.

IDEs also support performing incremental builds of a project. An incremental build is a build that compiles only source code files in a project that have changed since the project was last built, as well as the compilation of any other files affected by the changes to the source code files.

SUMMARY

This specification describes a static analysis extension to an IDE. The static analysis extension can be used with the IDE to perform incremental local analysis on a project maintained by the IDE. Results of the incremental local analysis can be displayed within a graphic user interface of the IDE for inspection by a user.

In general, one innovative aspect of the subject matter described in this specification can be embodied in methods that include the actions of receiving, by a static analysis plug-in of an integrated development environment (IDE) application installed on a user device, incremental build information identifying one or more source code files of a project that the IDE application has indicated as being source code files requiring recompilation in order to rebuild the project in response to one or more changes to the project; generating a plurality of extraction commands, one extraction command for each of the one or more source code files that the IDE has indicated as being files requiring recompilation; extracting source code from the one or more source code files according to the plurality of generated extraction commands; generating updated static analysis results from source code extracted from the one or more source code files requiring recompilation; generating a presentation of the updated static analysis results; and providing, for display to a user within the IDE on the user device, the presentation of the updated static analysis results. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Generating the updated static analysis results comprises generating the updated static analysis results from one or more new artifacts representing the source code extracted from the one or more source code files requiring recompilation and one or more other artifacts representing source code previously extracted from one or more other source code files. Generating the plurality of extraction commands comprises generating arguments that would be required to incrementally build the project. Generating arguments that would be required to incrementally build the project comprises generating arguments that would be required to incrementally build the project outside of the IDE. Generating the arguments comprises adding one or more paths of project directory locations corresponding to one or more library dependencies, project dependencies, or both. Generating the arguments comprises adding one or more paths of project output directories. Generating the presentation of the updated static analysis results comprises visually distinguishing the updated static analysis results from other static analysis results. Extracting source code from the one or more source code files according to the plurality of generated extraction commands comprises extracting source code only from source code files that the IDE has indicated as being files requiring recompilation. Extracting source code from the one or more source code files according to the plurality of generated extraction commands comprises extracting the source code without performing a build within the IDE.

Particular embodiments of the subject matter described in this specification can be implemented so as to realize one or more of the following advantages. A system can provide users with faster updated static analysis results. The system does not need to rebuild the project to provide updated static analysis results, resulting in fewer computing resources being used on static analysis. The system can provide updated static analysis results without extracting all source code from a project. The more rapid updates provide intuitive feedback for users and helps them improve their coding skills.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
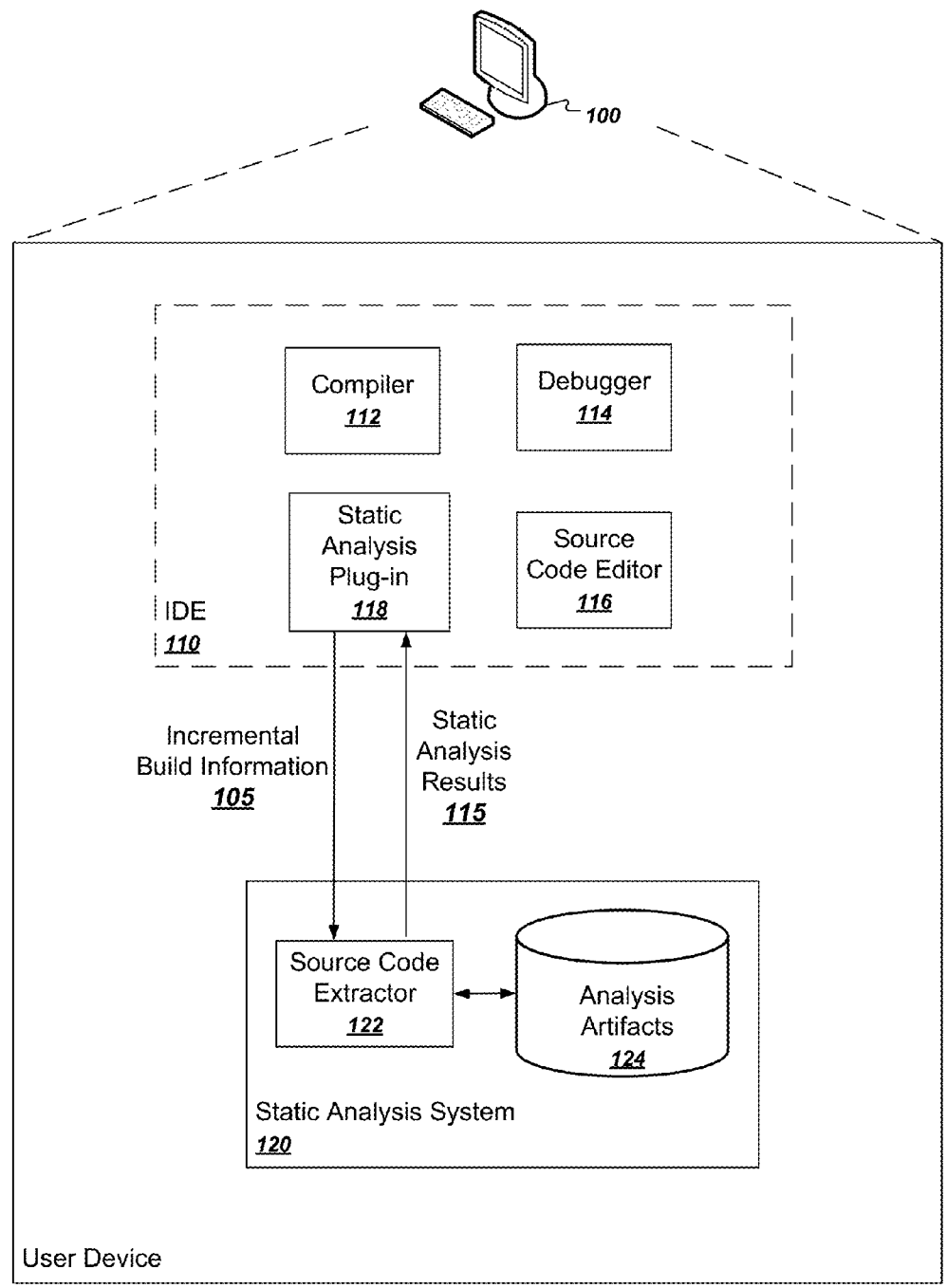
FIG. 1 illustrates an example system.

FIG. 1 illustrates an example system. A user device 100 has an installed IDE 110 and a static analysis system 120. In general, the static analysis system 120 can reuse incremental build information generated by the IDE 110 in order to locally perform incremental analysis on a project.

The IDE 110 includes several different software applications, including a compiler 112, a debugger 114, and a source code editor 116. The various software applications of the IDE may be installed as separate software applications or as different modules of a same software application.

A user of user device 100 can build projects using the IDE 110. The user can choose to perform a full rebuild of the project or an incremental build. During a full build, the IDE 110 compiles all source code files of the project. During an incremental build, the IDE 110 recompiles only a subset of source code files of the project. Performing an incremental build generates an output, e.g., a set of compiled object files and executables, that is equivalent to the output that would have been generated had the IDE 110 performed a full rebuild of the entire project.

The IDE 110 also includes a static analysis plug-in 118. The static analysis plug-in is a software application or module that extends the capabilities of the IDE 110 by allowing a user to interact with a static analysis system 120 through the IDE 110. For example, a user can choose one or more source code files for static analysis by the static analysis system 120, and the user can then view the static analysis results 115 generated by the static analysis system 120 within a user interface of the IDE 110.

The static analysis results 115 can include characteristic segments of extracted source code identified by the static analysis system 120. A characteristic segment of source code is a segment of source code having a particular attribute. The static analysis results 115 can include data specifying where, in the project, the characteristic segments of source code occur.

An example of characteristic segments of source code that the static analysis system 120 may generate for presentation within the IDE 110 is source code coding defects. Coding defects are segments of source code that violate one or more coding standards. Data representing such coding defects will be referred to as violations. Thus, a violation can identify a location in a source code file of a coding defect, a type of the coding defect, and the segment of source code that causes the coding defect. For example, a segment of source code that compares variables of different types is a coding defect, which can be represented by a corresponding violation that identifies the location of the source code, the source code itself, and a type of "comparison between variables of different types." For simplicity, the examples below may refer to identifying characteristic source code segments that are source code violations. However, the same techniques can be applied for other static analysis results that identify other characteristics, properties, or attributes of source code of a project. For example, the static analysis results can include a call graph of source code in a project.

To generate static analysis results 115, the static analysis system 120 extracts source code from files in the project using a source code extractor 122. The static analysis system 120 then generates analysis artifacts representing the source code. Analysis artifacts can be stored in any appropriate format, e.g., as files in a file system, objects, or records in a database, to name just a few examples. In some implementations, the static analysis system 120 generates an analysis artifact for each source code file.

The static analysis system 120 stores the analysis artifacts in a collection of analysis artifacts 124. The static analysis system 120 can then generate, from the full collection of analysis artifacts 124, a database populated with records that represent attributes of source code of the project.

The static analysis system 120 or the user of the IDE 110 can then query the database to obtain updated static analysis results 115 about the extracted source code. The static analysis system 120 can automatically query the generated database for some common static analysis results, e.g., source code violations or statistics about such violations. The static analysis system 120 can then automatically provide the static analysis results 115 to the static analysis plug-in 118 for presentation to the user. For other, less common results, the user of the IDE 110 can manually query the database. For example, the user of the IDE 110 can use the static analysis plug-in 118 to manually query the database to view a total number of lines of code in a project or to view a call graph of the project.

Performing static analysis on all source code in a project, which will be referred to as performing a full analysis, can be time consuming, particularly if the project is large. On the other hand, performing static analysis on only a recently modified subset of files of a project, which will be referred to as performing an incremental analysis, generally takes less time than performing a full analysis.

Performing an incremental analysis results in a full set of analysis artifacts that is equivalent to the set of analysis artifacts that would have been performed if a full analysis had been performed on all source code files of the project. In contrast, performing an incremental analysis involves reusing some analysis artifacts generated during a previous analysis. In other words, performing an incremental analysis requires generating only a subset of the analysis artifacts that would be generated by a performing a full analysis on the project.

The static analysis system 120 reuses incremental build information 105 generated by the IDE 110 in order to locally perform incremental analysis on a project. A user of the IDE 110 can use the source code editor 116 to edit source code files of the project. The IDE 110 can then generate incremental build information that includes a list of files that need to be recompiled due to the edits to the source code.

The static analysis system 120 can provide a more rapid update of static analysis results 115 by using the incremental build information 105 generated by the IDE 110 to perform incremental analysis locally. In other words, the static analysis system 120 can save time by performing incremental analysis on only the files that the IDE 110 on the user device 100 has identified as needing to be recompiled.

In operation, upon receiving source code files of a project, a user can use the IDE 110 to perform a full build of the project. The IDE 110 uses the compiler 112 and possibly other software modules to generate object files, libraries, and executable files of the full build.

After or during the full build, the static analysis plug-in can provide information about files that are being compiled to the static analysis system 120. The static analysis system 120 then performs a full analysis on the files that are compiled and stores the resulting analysis artifacts in the collection of analysis artifacts 124.

The user of the IDE 110 can then use the source code editor 116 to edit one or more source code files. In response to detecting the changed source code files, the IDE 110 generates incremental build information 105. The static analysis plug-in 118 detects that the IDE 110 has generated incremental build information 105 and provides the incremental build information 105 to the source code extractor of the static analysis system 120.

The static analysis system 120 then uses the incremental build information 105 to perform an incremental analysis on the project. In general, the static analysis system 120 transforms information in the incremental build information into a sequence of corresponding extraction commands that are provided to the source code extractor 122.

The static analysis system 120 then performs an incremental analysis on the source code files identified by the incremental build information 105. The source code extractor 122 then extracts the source code of the source code files identified by the incremental build information 105, and the static analysis system 120 generates analysis artifacts using the extracted source code.

After generating the analysis artifacts using the incremental build information 105, the static analysis system 120 can generate updated static analysis results 115 and provide the updated results 115 back to the static analysis plug-in 118 for presentation to the user.

Figure 2:
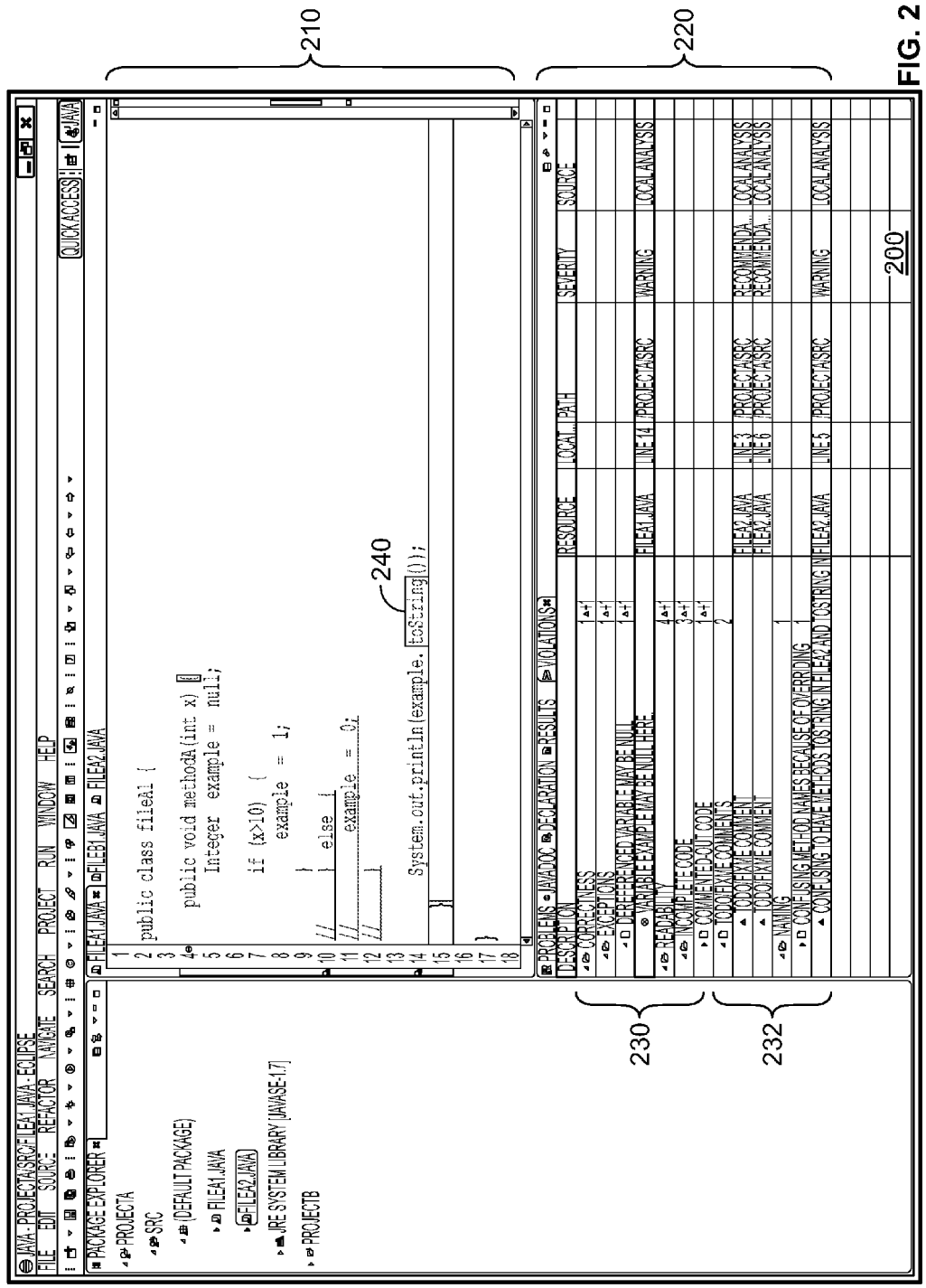
FIG. 2 is a diagram of an example presentation of updated static analysis results.

FIG. 2 is a diagram of an example presentation 200 of updated static analysis results. The presentation 200 is an example of a presentation generated by an IDE, e.g., the IDE 110 of FIG. 1, after performing an incremental analysis of source code in a project.

The presentation 200 includes a source code editor 210. The source code editor 210 displays a portion of source code of a source code file.

The presentation 200 also includes a static analysis window 220. The static analysis window 220 displays information about static analysis results.

The static analysis window 220 includes incremental static analysis results 230. The incremental static analysis results 230 are static analysis results that are different relative to a previous full analysis or a previous incremental analysis. For example, the incremental static analysis results 230 can highlight violations that were added by the user since the previous build.

The incremental static analysis results 230 can be visually distinguished from other static analysis results presented in the static analysis window 220. For example, the incremental static analysis results 230 can be highlighted, bolded, or presented in a different color.

The incremental static analysis results 230 can be organized in a variety of ways. For example, when the incremental static analysis results 230 identify source code violations, the violations can be organized by violation type.

In addition, the static analysis results in the static analysis window 220 can be organized by separating incremental results of a most recent incremental analysis from other previous static analysis results. For example, the incremental static analysis results 230 are visually distinguished from other static analysis results 232.

The presentation 200 also includes an inline markup 240 of source code corresponding to the incremental static analysis results 230. The inline markup 240 visually distinguishes source code corresponding to the incremental static analysis results 230 from other source code, including other source code corresponding to other static analysis results, e.g., source code that may have previously been identified as corresponding to static analysis results from a previous full analysis or incremental analysis.

Figure 3:
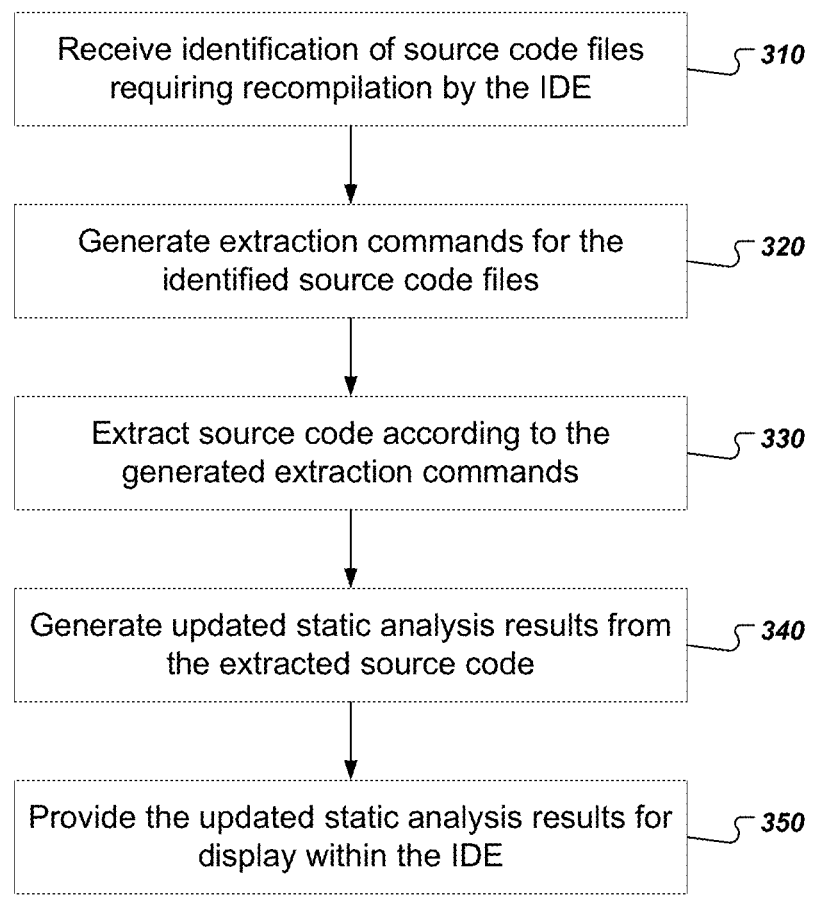
FIG. 3 is a flow chart of an example process for presenting incremental static analysis results.

FIG. 3 is a flow chart of an example process for performing incremental static analysis. The process can be performed by a static analysis plug-in of an IDE, a corresponding static analysis system, or both. The process will be described as being performed by an appropriately programmed system of one or more computers.

The system receives incremental build information identifying source code files requiring recompilation by the IDE (310). For the IDE to detect files that require recompilation, the IDE must have performed at least one initial full build. In some implementations, the IDE must have performed a full build locally on the user's device. The user may also have performed one or more subsequent incremental builds within the IDE.

The files requiring recompilation are files that are affected by changes to a project since the project was last built. The changes to the project can be the result of source code files being edited locally by the user or source code files being added to the project.

The IDE may or may not actually rebuild the project by recompiling the files identified as requiring require recompilation. In other words, the IDE need not rebuild the project for a static analysis system to extract source code and analyze the files identified as requiring recompilation. Thus, instead of files requiring recompilation, the IDE may instead provide only an identification of files compiled during a most recent build.

In some implementations, all the source code for the project resides on a single user device. Thus, the IDE need not consider source code that is stored remotely when determining which files require recompilation.

The system generates extraction commands for the identified source code files (320). The system can generate a separate extraction command for one or more of the identified source code files.

In some implementations, the system generates one or more arguments for each extraction command. The generated arguments correspond to the arguments that would be required to compile the source code file using a compiler outside of the IDE. Similarly, the arguments inform the extractor where to find necessary definitions of source code elements, e.g., function definitions and variable type definitions. In this way, the source code extractor can locate all dependency information necessary to analyze the source code files.

In some IDEs, a project can depend on libraries and also on other projects. Projects may also have an output directory that stores the output of a build. Below are the dependencies and output directories for two example projects, Project A and Project B:

ProjectA:
Output directory: /ProjectA/bin
Source directory: /ProjectA/src
Library dependency: /ProjectA/lib/a.jar
ProjectB:
Output directory: /ProjectB/bin
Source directory: /ProjectB/test
Library dependency: /ProjectB/lib/b.jar
Project dependency: ProjectA For these two example projects, assume that the IDE has indicated that the following files require recompilation:
/ProjectA/src/fileA1.java
/ProjectB/test/fileB1.java The system can then generate arguments for extracting these files according to the library and project dependencies. In general, the arguments specify paths of one or more project directory locations in which to search for source code dependencies. The system can also add additional paths that correspond to the output directory of each project.

The form of the arguments is language-dependent. In Java, for example, the foregoing dependencies and changed files would result in the following arguments:

For ProjectA: −classpath ProjectA/bin;ProjectA/lib/a.jar

The first classpath argument corresponds to the output directory of ProjectA, and the second classpath argument corresponds to the library dependency of ProjectA.

For ProjectB: −classpath ProjectB/bin;ProjectA/bin;ProjectB/lib/b.jar

The first classpath argument corresponds to the output directory of ProjectB. The second classpath argument corresponds to the project dependency on ProjectA, and the last classpath argument corresponds to the library dependency of ProjectB.

The system can then generate the full extraction commands for the changed files, which are:

extract /ProjectA/src/fileA1.java −classpath ProjectA/bin; ProjectA/lib/a.jar and extract /ProjectB/test/fileB1.java −classpath ProjectB/bin; ProjectA/bin;ProjectB/lib/b.jar The system extracts source code according to the generated extraction commands (330). The source code extractor thus extracts source code only from the files that need to be recompiled according to the IDE.

The source code extractor extracts the text of the source code files and any other necessary source code according to the generated dependency arguments. The source code extractor uses the generated dependency arguments to determine where and in which order to find definitions of source code elements in the changed source code files.

The system generates updated static analysis results from the extracted source code (340). For example, the updated static analysis results can include one or more source code violations from the extracted source code.

To generate the updated results, the system can generate an incremental analysis artifact for each extracted source code file. The system can then combine the incremental analysis artifacts with other analysis artifacts to generate a full collection of analysis artifacts for the project. Then system can then generate a database using the full collection of analysis artifacts and query the database to obtain updated static analysis results.

The system provides the updated static analysis results for display within the IDE (350). For example, the system can identify source code violations and generate a presentation that identifies the source code violations, as illustrated by FIG. 2.

The system can also generate a presentation that visually distinguishes new violations introduced in the project. In other words, the system can determine which violations that exist in the project did not exist in the previous build. To do so, the system can match violations in the project violations occurring in the previous build. The system can then identify unmatched violations occurring in the project as new violations. Example methods for matching violations are described in commonly-owned U.S. Provisional Patent Application No. 61/983,932, entitled "Source Code Violation Matching and Attribution," which is incorporated here by reference.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving, by a static analysis plug-in of an integrated development environment (IDE) application installed on a user device, incremental build information identifying one or more source code files requiring recompilation, the one or more source code files requiring recompilation being one or more source code files of a project that the IDE application has indicated as being source code files requiring recompilation in order to rebuild the project in response to one or more changes to the project;
    generating a plurality of extraction commands, one extraction command for each of the one or more source code files requiring recompilation;
    extracting source code from the one or more source code files requiring recompilation according to the plurality of generated extraction commands;
    generating incremental static analysis results from source code extracted from the one or more source code files requiring recompilation;
    generating a presentation of the incremental static analysis results; and
    providing, for display to a user within the IDE application on the user device, the presentation of the incremental static analysis results.

2. The method of claim 1, wherein generating the incremental static analysis results comprises generating the incremental static analysis results from one or more new artifacts representing the source code extracted from the one or more source code files requiring recompilation and one or more other artifacts representing source code previously extracted from one or more other source code files.

3. The method of claim 1, wherein generating the plurality of extraction commands comprises generating arguments that would be required to incrementally build the project.

4. The method of claim 3, wherein generating arguments that would be required to incrementally build the project comprises generating arguments that would be required to incrementally build the project outside of the IDE application.

5. The method of claim 3, wherein generating the arguments comprises adding one or more paths of project directory locations corresponding to one or more library dependencies, project dependencies, or both.

6. The method of claim 3, wherein generating the arguments comprises adding one or more paths of project output directories.

7. The method of claim 1, wherein generating the presentation of the incremental static analysis results comprises visually distinguishing the incremental static analysis results from other static analysis results.

8. The method of claim 1, wherein extracting source code from the one or more source code files according to the plurality of generated extraction commands comprises extracting source code only from source code files that the IDE application has indicated as being files requiring recompilation.

9. The method of claim 1, wherein extracting source code from the one or more source code files according to the plurality of generated extraction commands comprises extracting the source code without performing a build within the IDE application.

10. A computer program product, encoded on one or more non-transitory computer storage media, comprising instructions that when executed by one or more computers cause the one or more computers to perform operations comprising:

receiving, by a static analysis plug-in of an integrated development environment (IDE) application installed on a user device, incremental build information identifying one or more source code files requiring recompilation, the one or more source code files requiring recompilation being one or more source code files of a project that the IDE application has indicated as being source code files requiring recompilation in order to rebuild the project in response to one or more changes to the project;

generating a plurality of extraction commands, one extraction command for each of the one or more source code files requiring recompilation;

extracting source code from the one or more source code files requiring recompilation according to the plurality of generated extraction commands;

generating incremental static analysis results from source code extracted from the one or more source code files requiring recompilation;

generating a presentation of the incremental static analysis results; and providing, for display to a user within the IDE application on the user device, the presentation of the incremental static analysis results.

11. The computer program product of claim 10, wherein generating the incremental static analysis results comprises generating the incremental static analysis results from one or more new artifacts representing the source code extracted from the one or more source code files requiring recompilation and one or more other artifacts representing source code previously extracted from one or more other source code files.

12. The computer program product of claim 10, wherein generating the plurality of extraction commands comprises generating arguments that would be required to incrementally build the project.

13. The computer program product of claim 12, wherein generating arguments that would be required to incrementally build the project comprises generating arguments that would be required to incrementally build the project outside of the IDE application.

14. The computer program product of claim 12, wherein generating the arguments comprises adding one or more paths of project directory locations corresponding to one or more library dependencies, project dependencies, or both.

15. The computer program product of claim 12, wherein generating the arguments comprises adding one or more paths of project output directories.

16. The computer program product of claim 10, wherein generating the presentation of the incremental static analysis results comprises visually distinguishing the incremental static analysis results from other static analysis results.

17. The computer program product of claim 10, wherein extracting source code from the one or more source code files according to the plurality of generated extraction commands comprises extracting source code only from source code files that the IDE application has indicated as being files requiring recompilation.

18. The computer program product of claim 10, wherein extracting source code from the one or more source code files according to the plurality of generated extraction commands comprises extracting the source code without performing a build within the IDE application.

19. A system comprising:

one or more computers and one or more storage devices storing instructions that are operable, when executed by the one or more computers, to cause the one or more computers to perform operations comprising:

receiving, by a static analysis plug-in of an integrated development environment (IDE) application installed on a user device, incremental build information identifying one or more source code files requiring recompilation, the one or more source code files requiring recompilation being one or more source code files of a project that the IDE application has indicated as being source code files requiring recompilation in order to rebuild the project in response to one or more changes to the project;

generating a plurality of extraction commands, one extraction command for each of the one or more source code files requiring recompilation;

extracting source code from the one or more source code files requiring recompilation according to the plurality of generated extraction commands;

generating incremental static analysis results from source code extracted from the one or more source code files requiring recompilation;

generating a presentation of the incremental static analysis results; and providing, for display to a user within the IDE application on the user device, the presentation of the incremental static analysis results.

20. The system of claim 19, wherein generating the incremental static analysis results comprises generating the incremental static analysis results from one or more new artifacts representing the source code extracted from the one or more source code files requiring recompilation and one or more other artifacts representing source code previously extracted from one or more other source code files.

\* \* \* \* \*